June 3, 1969  S. FURST  3,447,707
DEVICE FOR UNLOADING TRANSFER CASES FILLED WITH TEXTILE COILS
Filed Jan. 26, 1967
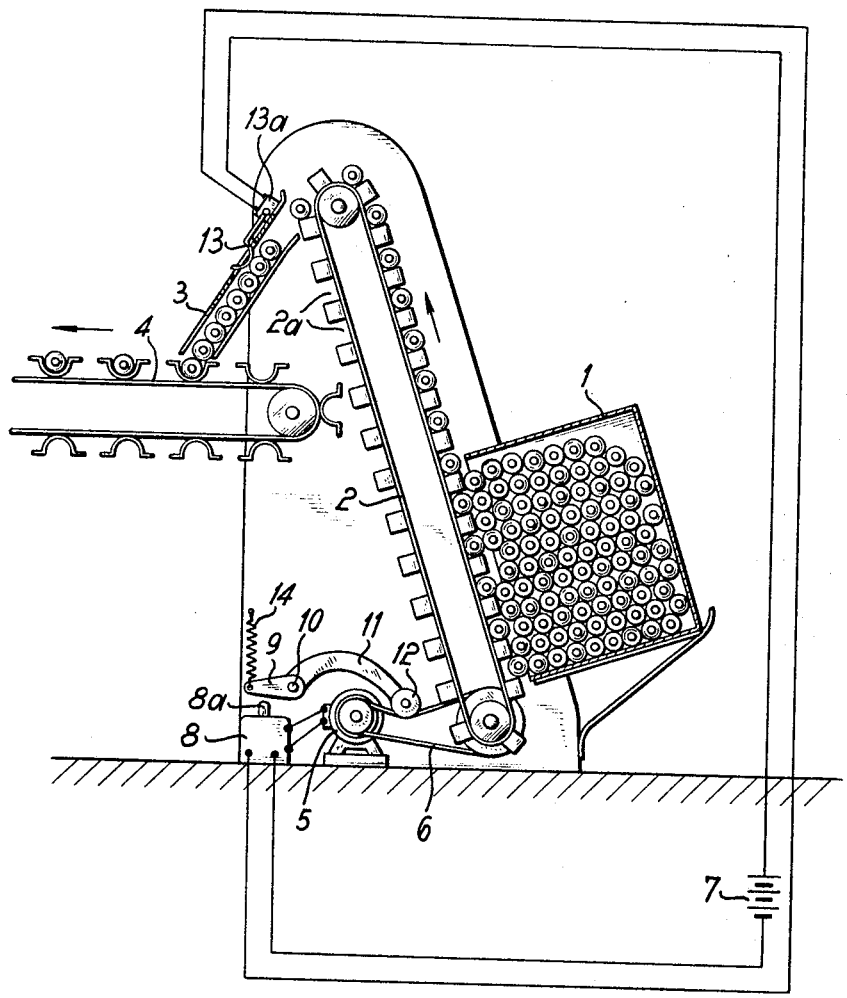

United States Patent Office 3,447,707
Patented June 3, 1969

3,447,707
DEVICE FOR UNLOADING TRANSFER CASES FILLED WITH TEXTILE COILS
Stefan Furst, Monchen-Gladbach, Germany, assignor to Walter Reiners. Monchen-Gladbach, Germany
Filed Jan. 26, 1967, Ser. No. 611,942
Claims priority, application Germany, Feb. 5, 1966, R 42,567
Int. Cl. B65b *21/02;* B65g *65/44, 43/00*
U.S. Cl. 214—307       5 Claims

ABSTRACT OF THE DISCLOSURE

Switch means are provided in a device for unloading transfer cases containing textile coils which serve to produce between transfer case and a conveyor apparatus provided with troughs passing below a discharge opening in the transfer case a temporary relative motion in a direction opposite that of the automatic normal run-direction of the conveyor apparatus whereby jammed coils are loosened and properly inserted in the troughs.

My invention relates to device for unloading transfer cases filled with textile coils, and more particularly to such a device that includes a conveyor located below the discharge opening of the transfer case, and provided with troughs for receiving the coils, the conveyor being movable by a drive mechanism having means for protection against overload.

In German Patent 1,174,662 there has been described a device for unloading transfer cases filled with textile coils comprising a conveyor band provided with troughs for receiving the coils that is passed lengthwise below the discharge opening of each transfer case. Another type of movable conveying apparatus provided with troughs for receiving the coils and located below the discharge opening of the transfer case is shown, for example, in the Swiss Patent 367,420, wherein the conveying apparatus comprises so-called divider or distributing discs. With all types of conveyor apparatus provided with troughs for receiving the coils, the coils will often not fall properly sidewise into the trough but will land instead tip or foot first in the trough and, as the conveyor apparatus is moved farther along, the surface of the coil may accordingly be damaged. It has therefore been proposed heretofore that an overload protector be provided in the drive mechanism of the conveyor apparatus to stop the conveyor belt in the event of such an occurrence. A servicing employee must then remove the jammed coil or cop or see to it that the cop is properly delivered into the trough before the band conveyor is again turned on.

It is accordingly an object of my invention to provide device for unloading transfer cases filled with textile coils which avoids the aforementioned disadvantages of the heretofore known devices of that type and which, more specifically, avoids the necessity for stopping the conveyor and the intervention of servicing personnel in order to free a jammed coil.

With the foregoing and other objects in view, I therefore provide in accordance with my invention, as a solution for the foregoing disadvantage of the heretofore known devices having an overload protection device for the drive mechanism of the conveyor apparatus, switch means which serve to produce a temporary relative motion between transfer case and conveyor apparatus opposite in direction to that of the associated automatic previous run of the conveyor apparatus. Whereas, in the case of the known devices, the overload protector only causes the conveyor band to stop, with the invention of this application, after the conveyor band has been stopped, an opposite relative motion is produced for a brief period between the transfer case and the conveyor device, for example by switching on the conveyor band for a short time to run opposite to its original direction or by transmitting corresponding movement to the transfer case. For this purpose, for example, a cam disc acting upon the support of the case can be used to move the case briefly back and forth in the travel direction of the conveyor band. It has been found that due to the brief opposite relative motion between transfer case and conveyor device, the improperly inserted coil is freed and is then properly deposited in the conveyor trough so that the switching device can again switch on the conveyor apparatus to carry out its automatic previous run.

The features that are considered as characteristic for the invention are set forth in the appended claims.

Although the invention has been illustrated and described herein as embodied in apparatus for unloading transfer cases filled with textile coils, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof, will be best understood from the following description of a specific embodiment when read in connection with the accompanying single figure of the drawing which schematically shows apparatus constructed in accordance with my invention.

In the drawing there is shown a transfer case 1 containing textile coils being delivered, for example from a spinning machine to a coil winding machine. The coils are to be removed from this transfer case 1 by means of the conveyor band 2 provided with conveyor troughs 2a. The conveyor band 2 is passed beneath the discharge opening of the transfer case 1. The textile coils are deposited in the conveyor troughs 2a as indicated and are carried by the conveyor band 2 to an intermediate magazine 3 from which they are supplied to a further conveyor band 4 which, in turn, delivers the textile coils to a machine that is to perform a further operation thereon, such as for example a coil winding machine. The drive means for the conveyor band 2 is a motor 5 and a chain or belt transmission 6. A schematically indicated electrical source 7 serves for driving the motor 5, a switching device 8 being connected in the circuit having a switching arm 8a actuable by the lever arm 9 of a double lever rotatable about the fixed axis 10, the other lever arm 11 of the double lever being supported by means of a roller 12 on the drive transmission chain or belt 6. A tension spring 14 biases the double lever 9, 11 to swing in a clockwise direction about the axis 10.

When a cop is inserted tip-forward or foot-forward from the transfer case 1 into a trough 2a, the force necessary for driving the conveyor belt increases due to the fact that a portion of that cop remains wedged between cops still located in the case, so that the transmission chain or belt 6 tightens up and swings the double lever 9, 11 in a direction counterclockwise about the pivot 10. The lever arm 9 then actuates the switch lever 8a of a reverse switching device 8 of suitable construction which, in any manner well known to those of ordinary skill in the art, introduces a reversal of the rotary direction of the motor 5 and therewith a reversal in the direction of movement of the conveyor band 2. The upper run of the transmission chain or belt 6 is, however, also thereby released of the load applied thereto so that the double lever 9, 11 can swing again in clockwise direction under the biasing action of the spring 14, and the switch lever 8a is then released once again. The motor 5 is thus automatically switched again to forward travel direction. A time-delay relay or the like can be built into the switching device 8, if desired, so as to maintain the reverse rotation of the motor 5 for a predetermined period such as for example two seconds. In the same manner, a time relay can be provided that is activated when the switch 8 is turned on and prevents the excessive starting moment of the motor 5 from producing any repeated reversal of the switching through the double lever 9, 11.

The determination of the maximum force with which the conveyor band 2 should be moved can obviously be effected in a different manner than by means of the aforedescribed sensing of the tension in the chain or transmission belt 6 through the double lever 9, 11. Thus, it is possible for example to measure the power consumed by the motor 5 and, when a predetermined power consumption is exceeded, to effect the reverse switching and subsequent return to the original directly switched condition. Another possibility for effecting the switch-over is to place a sensing member on the coil transfer case which releases the aforedescribed reverse switching steps when a specific force exerted on the coil transfer case in the direction of movement of the conveyor band is exceeded.

It is further to be noted from the figure that a sensing member 13 is located at the intermediate magazine 3 which determines the content of the intermediate magazine 3. Whenever the intermediate magazine 3 is filled by more than a predetermined quantity of coils, the sensing element 13 shuts the drive motor 5 off. Accordingly, the switch 13a actuated by the sensing device 13 is electrically connected in series with the switching device 8, because the extent to which the intermediate magazine 3 is filled must initially determine whether or not the transfer case unloading device should run at all.

I claim:
1. Device for unloading a transfer case for textile coils provided with an opening through which textile coils contained therein are discharged therefrom, comprising conveyor means having a plurality of troughs for receiving the discharged coils, said conveyor means being movable in a given direction adjacent the opening, drive means connected to said conveyor means for driving the same in said given direction, said drive means including switching mechanism actuable in response to overload of said drive means, whenever a coil is jammed in a respective trough, to impart a temporary relative motion between said transfer case and said conveyor means in a direction opposite to said given direction, whereby the jammed coil is loosened and properly inserted in the respective trough.

2. Device for unloading transfer cases according to claim 1, wherein said conveyor means comprises an endless conveyor belt, and the transfer case is disposed relative to said conveyor belt so that said conveyor belt passes below the opening of the transfer case.

3. Device for unloading transfer cases according to claim 1, wherein said drive means comprises a belt drive variable in tension in accordance with the load applied to said conveyor means, and means responsive to increased tension in said belt drive for actuating said switching mechanism.

4. Device for unloading transfer cases according to claim 3, wherein said belt drive is driven by a motor, said switching mechanism comprises a reversing switch connected to said motor, and said means responsive to increased tension comprises a pivotally mounted lever yieldably biased into continual engagement with said belt drive, said lever being pivotable in response to increased tension in said belt drive to engage and actuate said reversing switch whereby the direction of rotation of said motor is reversed.

5. Device for unloading transfer cases according to claim 4, including sensing means disposed at a predetermined location to which discharged coils are conveyed by said conveyor means, said sensing means being connected with said reversing switch for inactivating said drive means whenever a given maximum number of coils are located at said predetermined location.

References Cited

UNITED STATES PATENTS

| 1,527,337 | 2/1925 | Wilcox | 198—55 X |
| 1,996,472 | 4/1935 | Hermann | 221—253 |
| 2,797,793 | 7/1957 | Wilde | 198—232 X |

FOREIGN PATENTS 648,467  11/1962  Italy.

HUGO O. SCHULZ, *Primary Examiner.*

U.S. Cl. X.R.

57—52; 198—232; 214—8.5, 17; 221—13, 253, 254; 242—35.5